Patented Apr. 14, 1953

2,635,054

UNITED STATES PATENT OFFICE 2,635,054

MASTIC TILE CONTAINING A FILLER, A BINDER, A VEGETABLE OIL PITCH, AND WAX TAILINGS

Philip C. Doyle, Rocky River, Ohio, and Kenneth H. Rudd, Mount Lebanon, Pa., assignors to The Standard Oil Company, Cleveland, Ohio, a corporation of Ohio No Drawing. Application June 30, 1948, Serial No. 36,297

3 Claims. (Cl. 106—270)

The present invention relates to mastic tile and more particularly to mastic tile in which the plasticizer is wax tailings.

Mastic tile, as made conventionally, is a mixture of fillers with a blend of plastic materials. The fillers comprise mainly such inert materials as asbestos fibers and floats, calcium silicate, talc, marble dust, slate dust, limestone dust, magnesia, carbon black, precipitated carbon, air blown chalk, fly ash, mineral flour, lignin, wood flour, clay, cotton fiber and other organic or mineral fibrous material. Depending upon the color desired in the tile, the filler may also include one or more colored pigments such as red iron oxide, chrome green, lead chromate, ultramarine and the like. All of the above components and similar materials comprise the filler. Its composition is not critical and can be varied widely. The fillers, including the pigments, form no part of this invention.

The blend of plastic materials in conventional mastic tile is composed of three essential parts. These are the binder, the plasticizer and the homogenizer. The binder is ordinarily a high melting point (200°–350° F.) pitch, resin or natural asphalt, and acts as the primary agent for binding the fillers together as a compact permanent mass. Materials conventionally used as binders include gilsonite, gas oil pitch and coumar resins for dark or medium colored tile and coumar resins and polystyrene for light colored tile. The plasticizer is used to temper the brittleness of the binder and give the mass flexibility, resistance to impact and other desirable physical characteristics. Materials such as soft asphalt, high acid vegetable pitches and petroleum derived liquid resins are commonly used as plasticizers. The homogenizer is so called because it promotes the homogeneity of the binder-plasticizer blend, allows the resin mixture to coat the filler rapidly and completely, and gives the resultant mass tenacity to allow it to be removed from the milling roll in a single sheet. It also promotes the workability of a mixture while hot and enables the material to stick together in a Banbury mixer. Among the materials conventionally used as homogenizers are vegetable-derived pitches such as tall oil, palm oil, and cottonseed oil pitches.

It follows from the foregoing that acid pitches of vegetable origin can be used both as plasticizer and homogenizer in a two-component plastic blend. This has commonly been done in the past. However, the vegetable pitches are so unsatisfactory with regard to temperature stability, resistance to alkaline cleaners, and curling and shrinkage characteristics, that it is generally preferable to substitute one or more of the other types of plasticizers.

A conventional method of manufacturing mastic floor tiles with a two-component plastic blend is to mix equal parts by weight of gilsonite and fatty acid pitch with a filler such as asbestos fiber and a colored pigment in a Banbury type of mixer at about 400° F. for about four minutes, to dump the mix on a belt and carry it through mixing rolls, then working it further to eliminate blisters and rolling it out while hot between sheeting rolls. The rolled mixture is then calendered to the desired thickness, cut into tiles by means of block dies and finally cooled.

The compositions hitherto used in the manufacture of mastic tiles have several disadvantages which are important from an industrial point of view. Some of the more outstanding of these disadvantages are that the use of relatively large proportions of pitch or asphalt makes the composition difficult to handle, a great amount of cooling is required before the cutting operation because the rolling and calendering temperature far exceeds the temperature at which the sheets can be cut into tiles, the proportion of colored pigment that must be added is high in order to overcome the dark color of the pitch, and the flexure and impact characteristics of the finished tile leave much to be desired.

It has now been found that mastic tile, in which the plasticizer comprises wax tailings, can be produced economically and has physical characteristics that are superior in many respects to mastic tile now on the market.

Wax tailings is a petroleum derived hydrocarbon material made by the dry distillation of non-asphaltic or semi-asphaltic petroleum and is the last fraction to be distilled over before coke is formed. It is peculiar in its properties and generally free from paraffin wax. It is easily recognized by its yellow color and can readily be distinguished from fractions which distill over before the wax tailings. Upon cooling it forms a very viscous semi-liquid to sticky semi-solid of a characteristic yellow to yellowish-brown color.

If desired, the wax tailings can be reduced with steam to eliminate the more volatile components as is well understood in the art. The wax tailings can be blown with air so as to cause a condensation which raises the softening point of the wax tailings. By such air blowing the penetration can be reduced down to zero and the melting point correspondingly increased. The utilization of such oxidized wax tailings in accordance with this invention raises the temperature to which the blend can be subjected before softening and is included within the term "wax tailings" as used herein.

As illustrative of properties of wax tailings made at refineries at Lima, Ohio, and Toledo, Ohio, the following table is included:

| Type of Material | Steam Reduced Wax Tailings (Lima) | Steam Reduced and Oxidized Wax Tailings (Lima) | Steam Reduced Wax Tailings (56.5% Toledo and 43.5% Lima) |
|---|---|---|---|
| Sample No | 3 | 4 | 3A |
| Softening Point (R. & B.) °F | 118 | 154 | 156 |
| Penetration at 77° F. (100 g., 5 sec.) | 48 | 1 | 34 |
| Specific Gravity at 77° F | 1.118 | 1.134 | 1.144 |

The relative proportion of wax tailings to the binder and the homogenizer in the plastic blend for mastic tile of this invention may vary widely and is dependent primarily upon the intended use for the mastic tile and upon the characteristics desired. For practical purposes, it is generally desirable to utilize between about 2 to 10 parts by weight of plasticizer to 5 to 20 parts by weight of binder and 1 to 4 parts by weight of homogenizer.

The most effective proportions of the various ingredients in the plastic blend, and therefore the proportions utilized in the preferred embodiment of this invention, range from about 5 to about 10 parts by weight of plasticizer, of which at least half should be wax tailings in order to obtain the benefits of this invention, to from 15 to 20 parts by weight of binder and 1 to 4 parts by weight of homogenizer.

The proportion of plastic blend to filler in the mastic tile of this invention also may vary widely because it is dependent primarily upon the intended use for the tile and upon the physical characteristics ultimately desired. Generally it has been found advantageous to mix from about 20 to 30 parts by weight of plastic blend with about 70 to 80 parts by weight of filler.

Generally any wax tailings such as those described previously and listed in the foregoing table may be used in preparing the mix for the mastic tile of this invention. Inasmuch, however, as it is desirable that the plastic blend have a melting point at a temperature between about 180° to 200° F., it has generally been found advantageous to select wax tailings having a softening point at between about 100° and 160° F. and particularly wax tailings having a softening point in the lower portion of this range, i. e., between about 100° and 120° F.

A mixture of fillers with a plastic blend containing wax tailings as the plasticizer lends itself more readily to rolling and cutting operations than those used hitherto in the manufacture of mastic tiles. The components of the plastic blend and the fillers are all mixed together in a Banbury type mixer and then rolled out between a pair of pressure or sheet rollers to a thickness of 1/8, 3/16 or 1/4 of an inch or any other desired thickness. The temperature at which the mixture is rolled varies between 200° and 300° F., depending primarily upon the softening point and proportion of wax tailings present in the mixture. The use of wax tailings having a relatively low softening point is advantageous because it is thereby possible to roll the mixture at relatively low temperatures and thus to minimize the cooling required between the rolling and cutting operation. One of the primary advantages of this invention, therefore, is that the composition can be rolled at temperatures substantially below those hitherto required.

Another advantage is that wax tailings is lighter in color than many of the commonly used plasticizers and therefore makes it possible to reduce the amount of colored pigment required to color the finished product in the manner desired.

Another advantage of the present invention is that wax tailings is a relatively inexpensive by-product of the petroleum industry and that the use thereof in appreciable amounts, particularly for medium or light colored tile, results in substantial economic savings.

Still another advantage is that the percentage of vegetable pitch required as homogenizer is considerably lower when wax tailings is used as plasticizer than is the percentage required with other plasticizers.

Still further advantages of the invention are that mastic tile, rolled or calendered from mixes containing wax tailings as the plasticizer, have improved impact and flexure characteristics thus making them more resilient to walk upon when used as floor tile and more resistant to rupture by sudden and concentrated applications of heavy loads. Furthermore, the tile has an improved surface appearance. The presence of the wax tailings in the mix facilitates its handling in the processing equipment.

Last, but by no means least, master tile containing wax tailings as plasticizer has excellent temperature stability, that is, resistance to gas formation causing blisters, warping and the like, excellent resistance to alkaline cleansing agents as well as resistance to curling and shrinking in use.

Without in any way intending to limit the scope of the present invention, the following examples are included for illustrative purposes only.

Example 1

22.1 parts by weight of a plastic blend consisting of 8.0 parts by weight of gilsonite having a melting point between 275° and 290° F. and 5.3 parts by weight of a gas oil pitch having a melting point at 210° F. as the binder, 5.7 parts by weight of reduced wax tailings having a softening point at between 100° and 110° F., and 3.1 parts by weight of cottonseed oil pitch having a melting point at 130° F. were thoroughly mixed in a Banbury type mixer with 77.9 parts by weight of a conventional filler including 2.7 parts by weight of pigment.

The mixture was rolled at a temperature of 250° F. into a sheet having a thickness of 1/8 of an inch. This sheet was cooled to a temperature of about 120° F. and cut into tiles.

It was found that the finished tiles had a brown shade, that they had a smooth surface free from grit and lumps, a penetration of 9, a flexure of 33+ and an impact strength of OK+. These physical characteristics were determined and rated in accordance with the test procedures and ratings set up by the Bureau of Standards.

Example 2

21.6 parts by weight of a plastic blend consisting of 7.6 parts by weight of gilsonite having a melting point between 275° and 290° F. and 5.2 parts by weight of gas oil pitch having a melting point at 210° F. as the binder, 6.0 parts by weight of reduced wax tailings having a softening point between 100° F., and 110° F., and 2.8 parts by weight of cottonseed oil pitch having a melting point of 130° F. were thoroughly mixed in a Banbury type mixer with 78.4 parts by weight of filler including 2.4 parts by weight of pigment. The mixture was rolled at a temperature of 250° F. into a sheet having a thickness of ⅛ of an inch which was then cooled to a temperature of about 120° F. and cut into tiles.

It was found that, except for its darker color, the physical characteristics of the finished tile were substantially similar to those of the tile described in Example 1.

*Example 3*

30.2 parts by weight of a plastic blend consisting of 7.8 parts by weight of "Velsicol" resin, i. e., a non-oxidizing type, solid synthetic hydrocarbon resin of petroleum origin having a melting point between 230° and 245° F., a specific gravity of 1.090 to 1.120, an iodine number of 30 to 60 and which is insoluble in ketones, alcohols and glycols, partially soluble in esters, turpentine and mineral oils, and completely soluble in aromatic and aliphatic naphthas, drying, semi-drying and non-drying vegetable oils, and marine oils, and 11.6 parts by weight of polystyrene as the binder, 7.7 parts by weight of reduced wax tailings having a softening point between 100° and 110° F., and 3.1 parts by weight of tall oil pitch were mixed thoroughly in a Banbury type mixer with 69.8 parts by weight of filler, no pigment being included in the filler.

After the components were thoroughly mixed, the mixture was rolled at a temperature of 250° F. into a sheet having a thickness of ⅛ of an inch. This sheet was cooled to a temperature of about 120° F. and cut into tiles.

It was found that the finished tile had a medium light shade, a smooth surface free from grit and lumps, a penetration of 8, a flexure of 1.45 inches and an impact strength of OK+, the tests and ratings being the same as those described in Example 1.

It is to be understood, of course, that pigment can be added to the mixture described in this example to give any desired color to the tile.

*Example 4*

25 parts by weight of a plastic blend consisting of 13.25 parts by weight of gilsonite, 2.4 parts by weight of a gas oil pitch having a melting point at 210° F. as the binder, 8.15 parts by weight of wax tailings having a softening point at 118° F., and 1.2 parts by weight of cottonseed oil pitch having a melting point of 130° F. were thoroughly mixed in a Banbury type mixer with 75 parts by weight of a filler consisting of 63.75 parts by weight of asbestos, 7.57 parts by weight of marble dust and 3.68 parts by weight of red oxide.

After the components were thoroughly mixed, the composition was rolled at a temperature of 250° F. into a sheet having a thickness of ¼ of an inch. This sheet was cooled to a temperature of about 120° F. and cut into tiles.

It was found that the finished tile had an attractive red shade, a smooth surface free from grit and lumps, a penetration equal to that of standard quality asphalt tile, a flexure across the grain that is 1⅓ as great as that of standard asphalt tile, a flexure with the grain that is twice as great as that of standard asphalt tile and an impact strength that far exceeds the impact strength of standard asphalt tile.

It is to be understood that the present invention is capable of innumerable modifications and that the composition described herein is susceptible to a wide variety of applications that will readily occur to those skilled in the art upon reading the present description. All such modifications and applications are intended to be included within the scope of this invention as defined in the appended claims.

We claim:

1. A mastic tile comprising essentially a plastic blend and a filler in which the plastic blend comprises between five and twenty parts by weight of a binder having a melting point between 200 and 350° F. and selected from the group consisting of gilsonite, gas oil pitch, coumar resins, polystyrene, a combination of gilsonite and gas oil pitch and a combination of polystyrene and a non-oxidizing type, solid synthetic hydrocarbon resin of petroleum origin having a melting point between 230° and 245° F., a specific gravity of 1.090 to 1.120, an iodine number of 30 to 60 and which is insoluble in ketones, alcohols and glycols, partially soluble in esters, turpentine and mineral oils, and completely soluble in aromatic and aliphatic naphthas, drying, semi-drying and non-drying vegetable oils, and marine oils, between two and ten parts by weight of wax tailings having a softening point between about 100 and 120° F. and between one and four parts by weight of vegetable oil pitch.

2. A mastic tile comprising essentially a plastic blend and a filler in which the plastic blend comprises between fifteen and twenty parts by weight of a binder having a melting point between 200 and 350° F. and consisting of gilsonite and gas oil pitch, between five and ten parts by weight of wax tailings having a softening point between about 100 and 120° F., and between one and four parts by weight of vegetable oil pitch.

3. A mastic tile comprising essentially a plastic blend and a filler in which the plastic blend comprises between fifteen and twenty parts by weight of a binder having a melting point between 200 and 350° F., and consisting of polystyrene and a non-oxidizing type, solid synthetic hydrocarbon resin of petroleum origin having a melting point between 230° and 245° F., a specific gravity of 1.090 to 1.120, an iodine number of 30 to 60 and which is insoluble in ketones, alcohols and glycols, partially soluble in esters, turpentine and mineral oils, and completely soluble in aromatic and aliphatic naphthas, drying, semi-drying and non-drying vegetable oils, and marine oils, between five and ten parts by weight of wax tailings having a softening point between about 100° and 120° F., and between one and four parts by weight of vegetable oil pitch.

PHILIP C. DOYLE.
KENNETH H. RUDD.

References Cited in the file of this patent

UNITED STATES PATENTS

| Number | Name | Date |
| --- | --- | --- |
| 2,362,934 | Schlaanstine | Nov. 14, 1944 |
| 2,365,491 | Powers | Dec. 19, 1944 |

OTHER REFERENCES

"Asphalts and Allied Substances," by Abraham, 4th Edition, pp. 468–469.